(12) United States Patent
Di Giovanni

(10) Patent No.: US 11,162,576 B2
(45) Date of Patent: Nov. 2, 2021

(54) PLANET-CARRIER FOR A REDUCTION GEAR OF THE PLANETARY TYPE

(71) Applicant: SAFRAN TRANSMISSION SYSTEMS, Colombes (FR)

(72) Inventor: Jean-Charles Michel Pierre Di Giovanni, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/706,511

(22) Filed: Dec. 6, 2019

(65) Prior Publication Data

US 2020/0191258 A1 Jun. 18, 2020

(30) Foreign Application Priority Data

Dec. 13, 2018 (FR) ...................................... 1872867

(51) Int. Cl.
*F16H 57/08* (2006.01)
*B64D 35/02* (2006.01)
(Continued)

(52) U.S. Cl.
CPC ........... *F16H 57/082* (2013.01); *B64D 35/02* (2013.01); *F02C 7/36* (2013.01); *F16H 1/36* (2013.01);
(Continued)

(58) Field of Classification Search
CPC ... F16H 57/08; F16H 57/0421; F16H 57/0479
See application file for complete search history.

(56) References Cited

U.S. PATENT DOCUMENTS 7,011,599 B2 * 3/2006 Becquerelle .......... F16H 1/2827
475/331
8,529,197 B1 * 9/2013 Coffin ..................... F01D 25/04
415/119

FOREIGN PATENT DOCUMENTS

EP 1464869 A1 10/2004
EP 2360047 A1 8/2011
(Continued)

OTHER PUBLICATIONS

Preliminary Research Report received for French Application No. 1872867, dated Jul. 23, 2019, 5 pages (1 page of French Translation Cover Sheet and 4 pages of original document).

*Primary Examiner* — Derek D Knight
(74) *Attorney, Agent, or Firm* — Womble Bond Dickinson (US) LLP

(57) ABSTRACT

Planet-carrier (10) for a reduction gear (6), in particular for a turbine engine of an aircraft, said planet-carrier comprising an annular cage extending about an axis X and comprising two radial annular walls (14a, 14b) extending about the axis X and connected at their outer periphery by means of first fins (14c), said radial walls being intended to be arranged opposite the planet gears (8) of the reduction gear, and said first fins defining between them the first assembly spaces (16) for these planet gears, characterised in that the planet-carrier is made of a single block and further comprises an attachment ring (15) that extends about the axis X and is connected to one of said walls by means of second fins (14d), said second fins defining between them second spaces (17a, 17b), separate from the first spaces (16), and of which at least some are intended to be intersected by lubrication pipes (20f, 21f) of the reduction gear.

12 Claims, 13 Drawing Sheets

(51) Int. Cl.
*F02C 7/36* (2006.01)
*F16H 1/36* (2006.01)
*F16H 57/04* (2010.01)

(52) U.S. Cl.
CPC ....... *F16H 57/042* (2013.01); *F16H 57/0486* (2013.01); *F05D 2260/40311* (2013.01); *F05D 2260/98* (2013.01); *F16H 57/0479* (2013.01); *F16H 2057/085* (2013.01)

(56) References Cited

FOREIGN PATENT DOCUMENTS

| | | |
|---|---|---|
| EP | 2940347 A1 | 11/2015 |
| EP | 3236111 A1 | 10/2017 |
| EP | 3489550 A1 | 5/2019 |
| FR | 2987416 A1 | 8/2013 |
| FR | 3041054 A1 | 3/2017 |
| WO | 2010/092263 A1 | 8/2010 |
| WO | 2018/083410 A1 | 5/2018 |
| WO | 2019/130006 A1 | 7/2019 |

\* cited by examiner

[Fig.1]
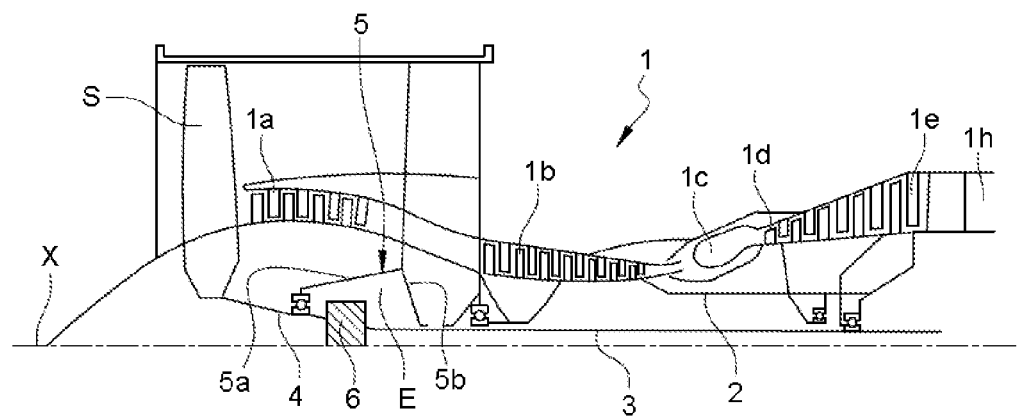

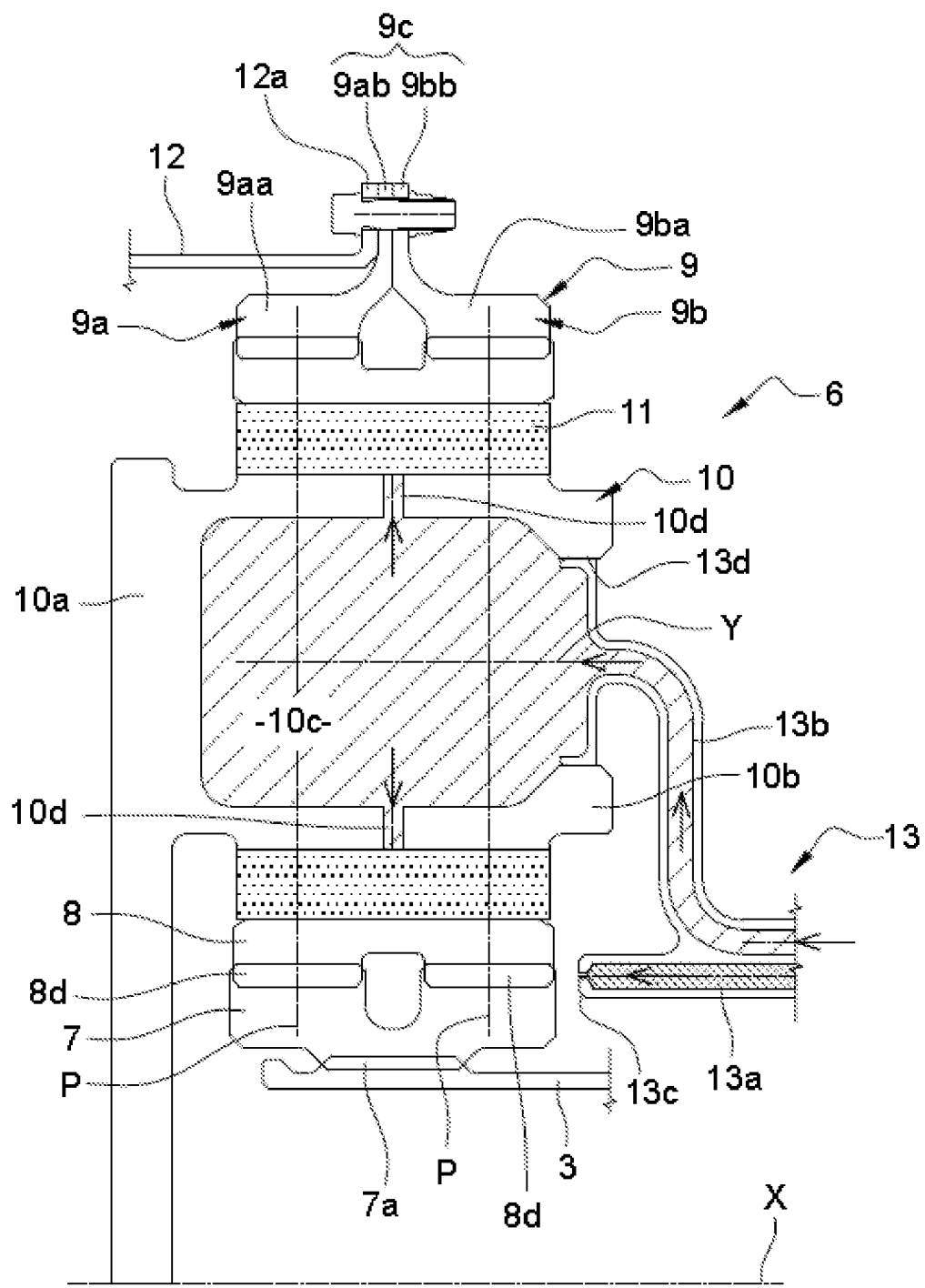
[Fig.2]

[Fig.3]
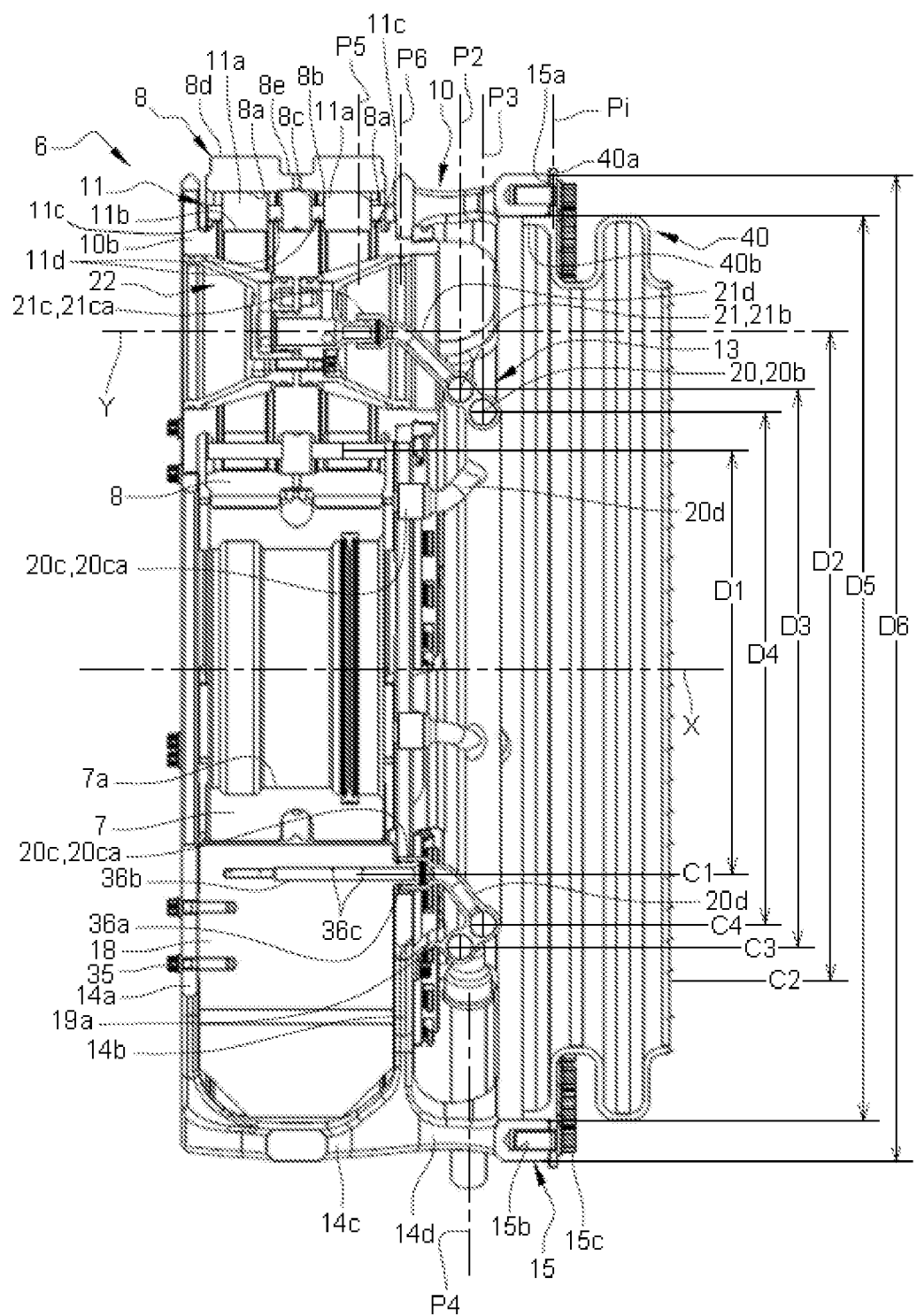

[Fig.4]
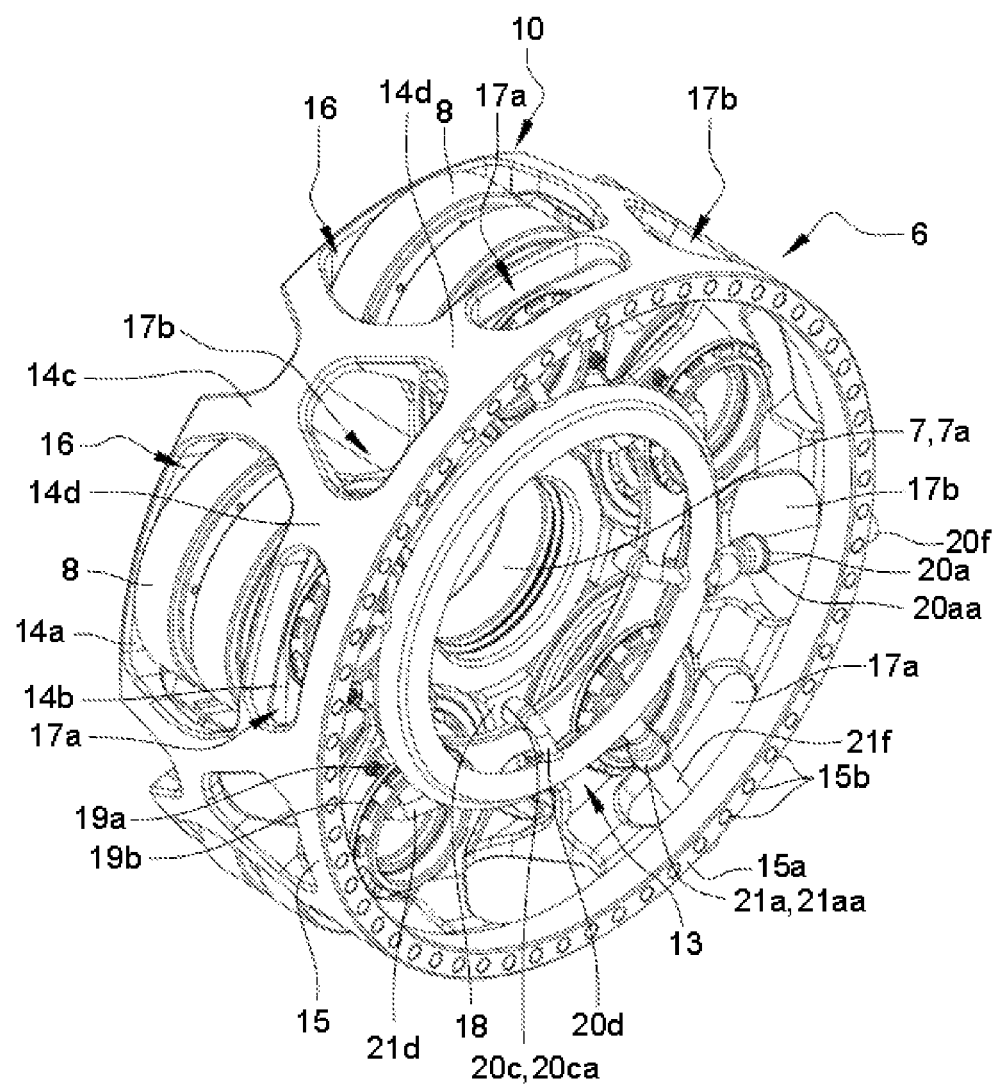

[Fig.5]
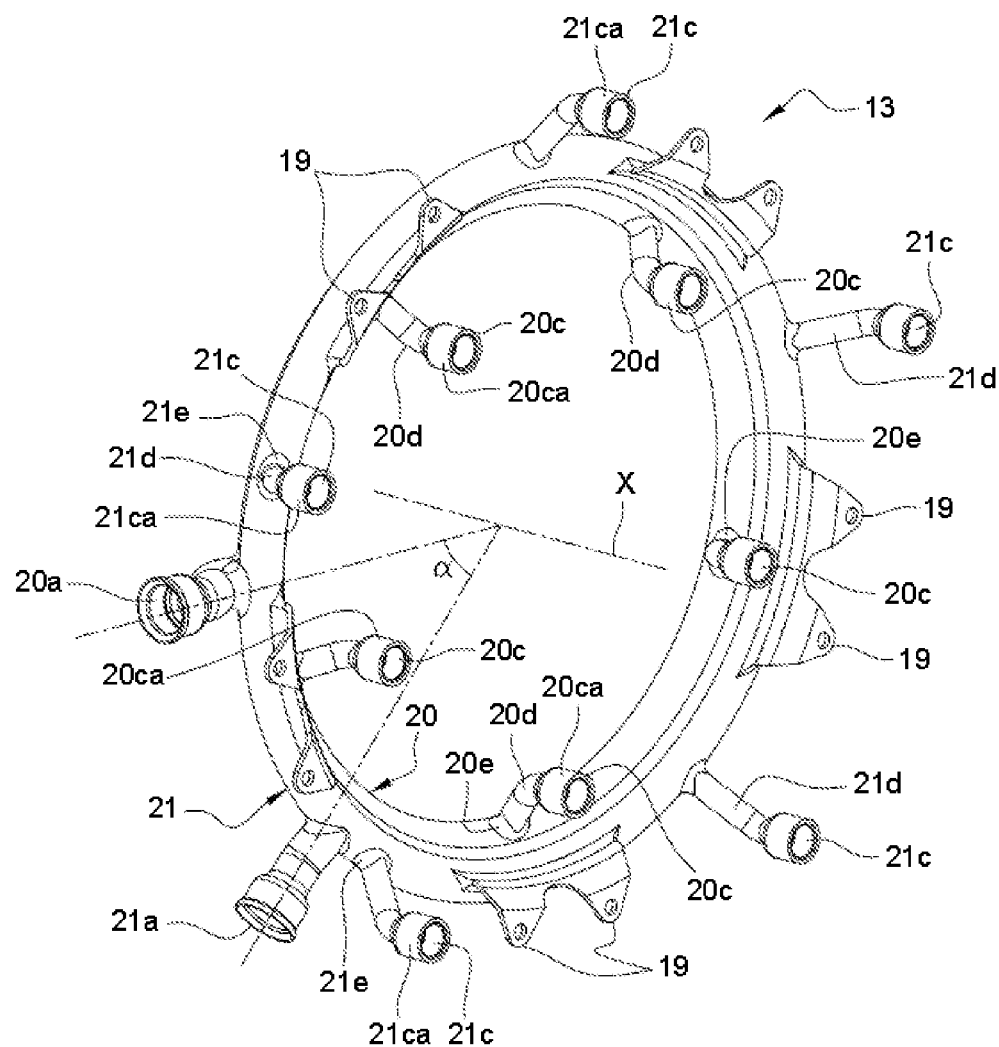

[Fig.6]
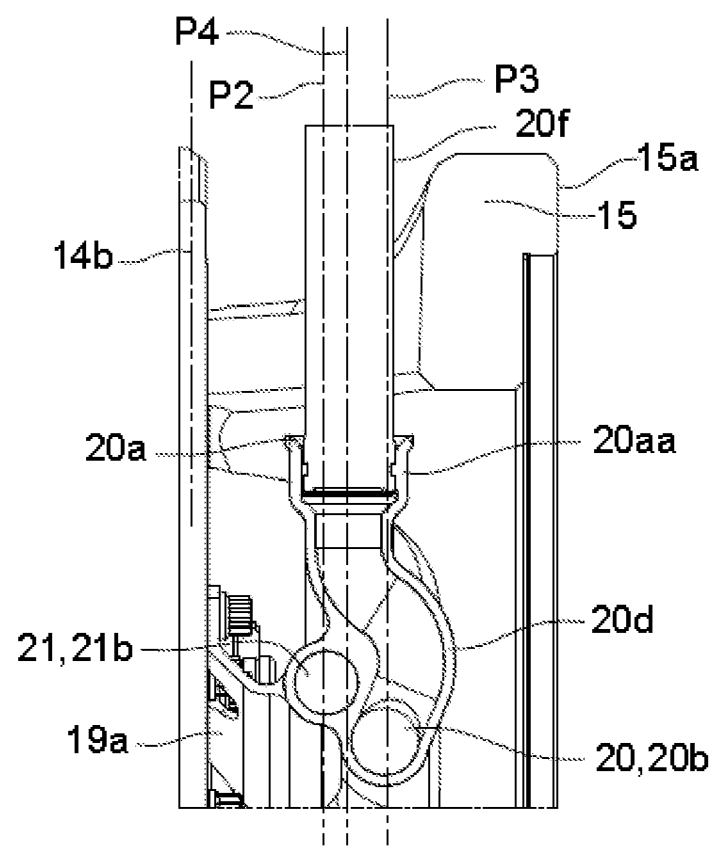

[Fig.7]
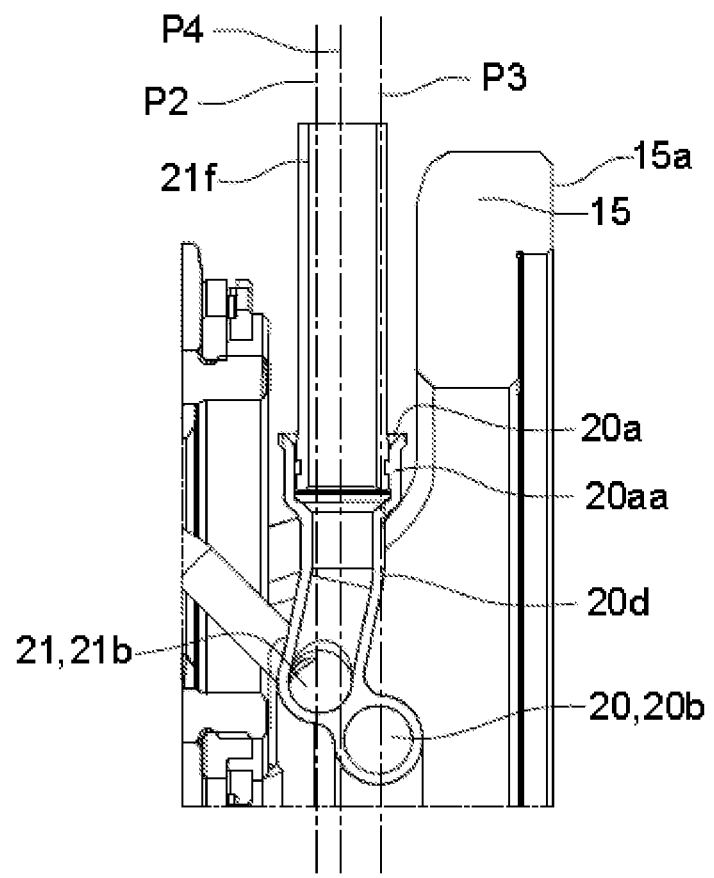

[Fig.8]
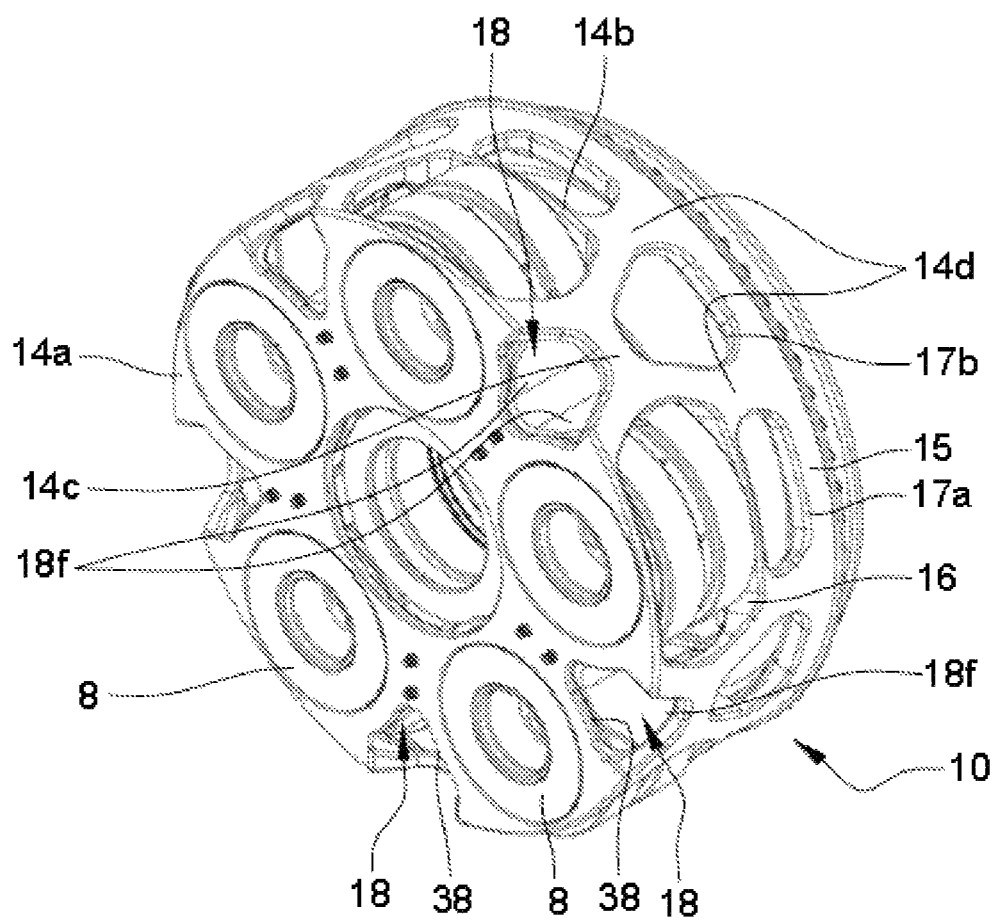

[Fig.9]
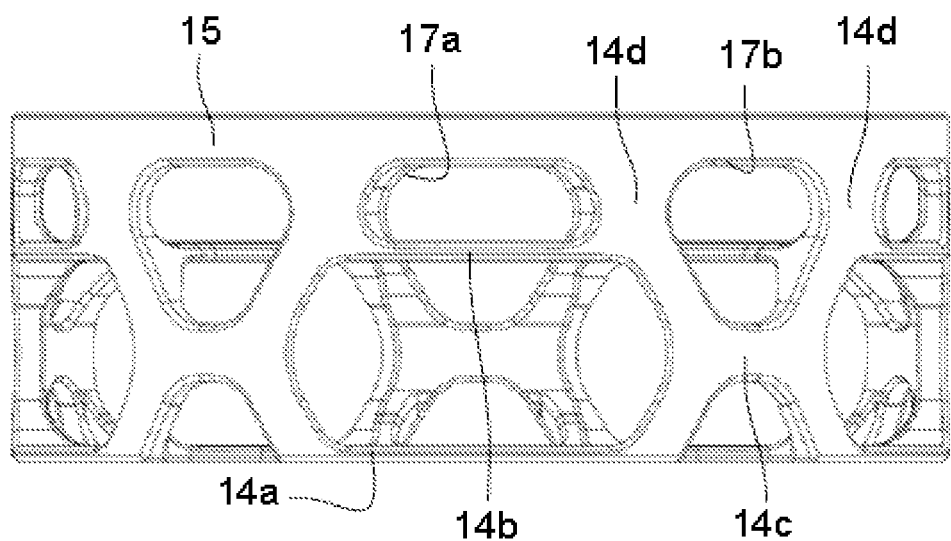

[Fig.10]
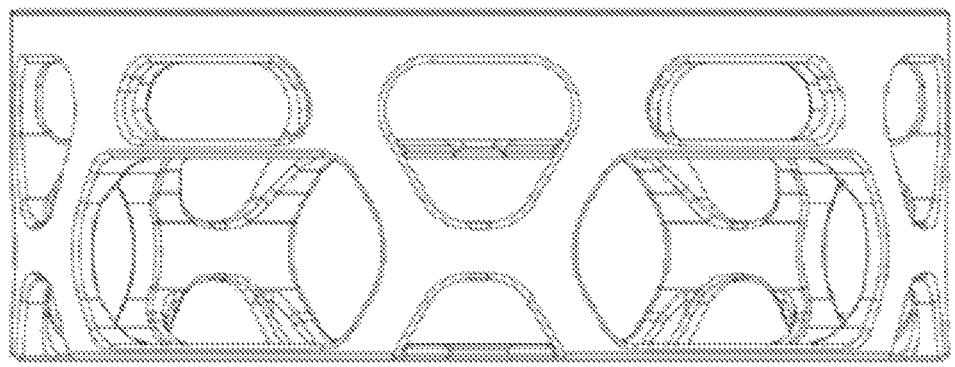

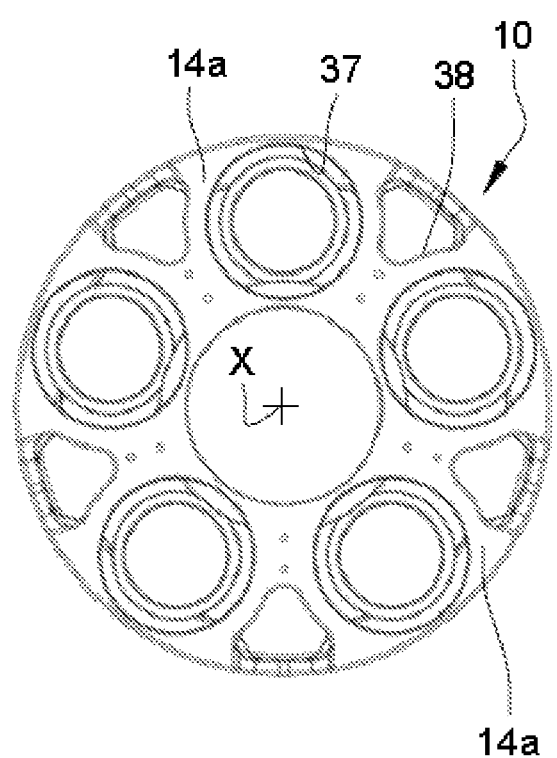
[Fig.11]

[Fig.12]
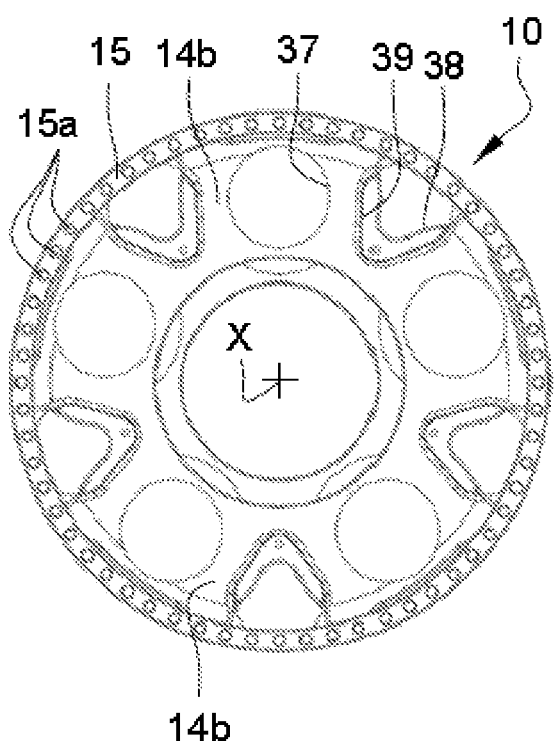

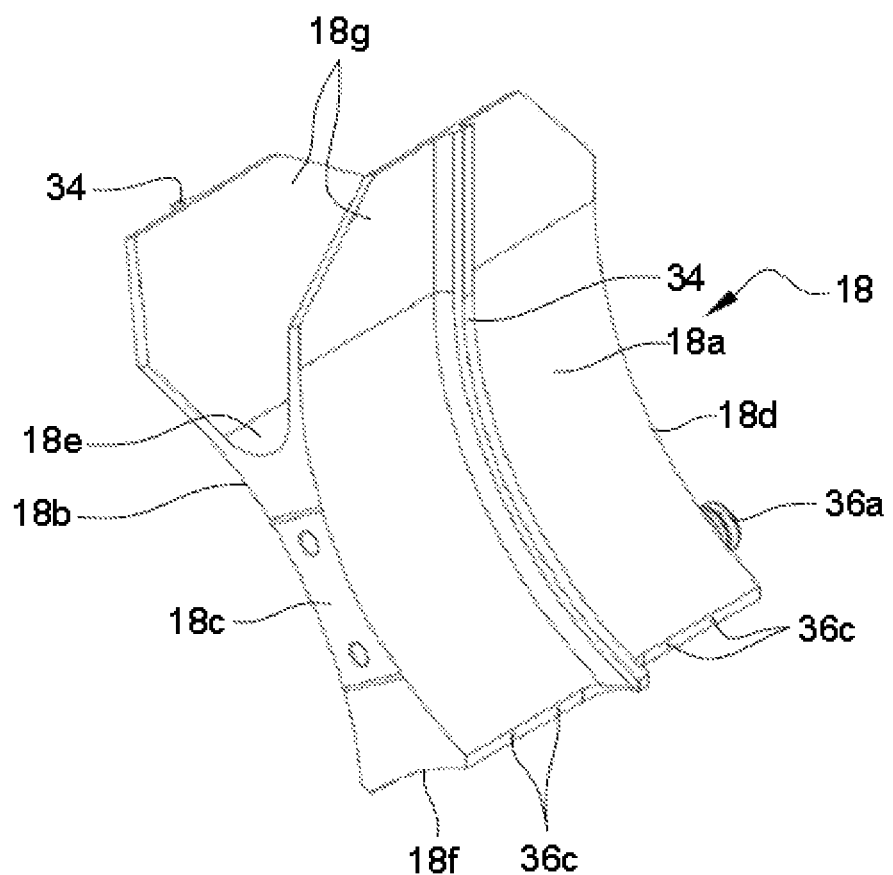
[Fig.13]

PLANET-CARRIER FOR A REDUCTION GEAR OF THE PLANETARY TYPE

The state of the art includes, in particular, documents WO-A1-2010/092263, FR-A1-2 987 416, EP-A1-2 940 347, EP-A1-3 236 111, EP-A1-2 360 047, WO-A1-2018/083410, EP-A1-3 489 550, WO-A1-2019/130006 and FR-A1-3 041 054.

TECHNICAL BACKGROUND

The present invention relates to the field of reduction gears for turbine engines, in particular of an aircraft.

The purpose of a mechanical reduction gear is to change the speed to torque ratio between the input shaft and the output shaft of a mechanical system.

The new generations of bypass turbine engines, in particular turbine engines with high dilution rates, comprise a mechanical reduction gear that drives the shaft of a fan. Usually, the purpose of the reduction gear is to transform the "fast" rotational speed of a power turbine into a slower rotational speed for the shaft driving the fan.

This type of reduction gear comprises a central pinion, termed sun gear, a ring gear and pinions termed planet gears, the latter engaging between the sun gear and the ring gear. The planet gears are maintained by a chassis termed planet-carrier. The sun gear, the ring and the planet-carrier are planetary elements because their axes of revolution are the same as the longitudinal axis X of the turbine engine. The planet gears each have a different axis of revolution, evenly distributed over a single operating diameter around the axis of the planetary elements. These axes are parallel with the longitudinal axis X.

There are several reduction gear architectures. According to the state of the art of bypass turbine engines, the reduction gears are of the planetary or epicyclic type. In other similar applications, "differential" or compound architectures can be found.

In a planetary reduction gear, the planet carrier is fixed and the ring gear constitutes the output shaft of the device that rotates in the opposite direction of the sun gear.

In an epicyclic reduction gear, the ring gear is fixed and the planet-carrier constitutes the output shaft of the device that rotates in the same direction as the sun gear.

In a differential reduction gear, no element is rotationally fixed.

The ring gear rotates in the opposite direction of the sun gear and the planet-carrier.

The reduction gears can comprise one or several gear stages. This gearing is achieved in different ways, as by contact, by friction and even by magnetic fields. There are several types of gearing by contact, such as with straight or herringbone gears.

The planet-carrier of a reduction gear can be in the form of a cage in which the sun gear, the planet gears, the guide bearings of the planet gears and the lubricating means of the planet gears and of the sun gear are housed. The sun gear comprises inner splines for coupling to a first shaft of the turbine engine and the planet-carrier or the ring-carrier is coupled to another shaft.

The planet-carrier can be made of a single block. In this case, its cage is connected to a cage-carrier by means of a rigid connection. According to a variant, it is possible to consider a technology whereby the cage is connected to the cage-carrier by means of soft connections, such as those described in document EP-A1-1 464 869. Although this assembly is rendered more complicated because of its hyperstatic nature and although it constitutes a heavy and costly assembly, it tolerates some misalignment between the planet gears and the sun gear and ring gear.

As mentioned above, a planetary reduction gear has a fixed planet-carrier connected to a stator element of the turbine engine by means of a flexible part in order to enable the realignment of the reduction gear and the first shaft. In the case of a single-block planet-carrier, the latter is generally not configured or optimised to facilitate the integration and powering of the lubricating circuits of the reduction gear.

The present invention proposes an improvement that provides a simple, efficient and economical solution to this problem.

SUMMARY OF THE INVENTION

For this purpose, the invention proposes a fixed planet-carrier for a reduction gear, in particular for a turbine engine of an aircraft, said planet-carrier comprising an annular cage extending about an axis X and comprising two radial annular walls extending about the axis X and connected at their outer periphery by means of first fins, said radial walls being intended to be arranged opposite the planet gears of the reduction gear, and said first fins defining between them the first assembly spaces of these planet gears, characterised in that the planet-carrier is made of a single block and further comprises an attachment ring that extends about the axis X and is connected to one of said walls by means of second fins, said second fins defining between them second spaces, separate from the first spaces, and of which at least some are intended to be intersected by lubrication pipes of the reduction gear.

The solution proposed here is particularly designed for a planetary reduction gear, i.e. with a fixed planet-carrier (and therefore with a mobile ring gear), the planet-carrier being in this case made of a single block. This solution is compatible with any other type of gears (straight, herringbone). Finally, the solution is compatible with any type of planetary bearings, regardless of whether they are made of rolling elements (ball bearings, roller bearings, tapered roller bearings, etc.) or of hydrodynamic bearings, etc.

The planet-carrier according to the invention can comprise one or several of the following characteristics, taken individually or in combination:

- the first fins have a general X shape and the second fins extend in the continuity of the first fins;
- the attachment ring has an outer diameter that is identical or close to the diameter of the radial walls;
- the attachment ring comprises a radial face on which a series of attachment means open, such as tapered orifices for example;
- some of said second spaces are axially aligned with said first spaces and each has a general elongate shape in the circumferential direction about the X axis;
- some of said second spaces are axially aligned with said first fins and each has a general triangular shape;
- said attachment ring is axially offset with respect to said cage;
- the planet-carrier comprises oil deflectors located between the planet gears, these deflectors being provided in the cage of the satellite-carrier or formed of a single part with said cage.

The present invention also relates to an assembly comprising a planet-carrier such as described below, and at least one of the following members:

a distributor of lubricating oil, the distributor having a generally annular shape about the axis X and being mounted on the planet-carrier inside said ring, the distributor comprising at least an oil circuit comprising an oil inlet connected to a supply pipe extending in a radial direction and intersecting with one of said second spaces, and an elastically deformable member, said member having a generally annular shape about the axis X and comprising an axial end secured to said ring.

Advantageously, the distributor comprises two independent oil circuits, a first oil circuit comprising a first oil inlet connected by a first supply pipe intersecting with one of said second spaces, and a second oil circuit comprising a second oil inlet connected by a second supply pipe intersecting with another of said second spaces.

In a preferred embodiment of the invention, the first pipe intersects with a second space with a generally triangular or trapezoidal shape and the second pipe intersects with a second space with a shape that is elongate in the circumferential direction.

The invention also relates to a reduction gear, in particular for a turbine engine of an aircraft, comprising a planet-carrier or an assembly such as described above.

BRIEF DESCRIPTION OF THE FIGURES

Other characteristics and advantages will be appear more clearly upon reading the following description of a non-limiting embodiment of the invention and with reference to the appended drawings, in which:

FIG. 1 is a schematic axial cross-section view of a turbine engine comprising the invention, FIG. 2 is a partial axial cross-section view of a mechanical reduction gear, FIG. 3 is an axial cross-section view of a mechanical reduction gear according to the invention, FIG. 4 is a perspective view of the reduction gear of FIG. 3, seen from the rear, FIG. 5 is a perspective view of a lubricating oil distributor of the reduction gear of FIG. 3, FIG. 6 is a cross-section view of a detail of the reduction gear of FIG. 3, and shows an oil inlet of the distributor of FIG. 5, FIG. 7 is a cross-section view of another detail of the reduction gear of FIG. 3, and shows another oil inlet of the distributor of FIG. 5, FIG. 8 is a perspective view of the planet-carrier of the reduction gear of FIG. 3, seen from the front, the planet gears and the sun gear of the reduction gear being present in the planet-carrier, FIG. 9 is a side or top view of the planet-carrier of the reduction gear of FIG. 3, FIG. 10 is another side or top view of the planet-carrier of the reduction gear of FIG. 3, FIG. 11 is a front view of the planet-carrier of the reduction gear of FIG. 3, FIG. 12 is a rear view of the planet-carrier of the reduction gear of FIG. 3, FIG. 13 is a perspective view of a deflector of the reduction gear of FIG. 3.

DETAILED DESCRIPTION OF THE INVENTION

FIG. 1 describes a turbine engine 1 that comprises, conventionally, a fan S, a low-pressure compressor 1a, a high-pressure compressor 1b, an annular combustion chamber 1c, a high-pressure turbine 1d, a low-pressure turbine 1e, and an exhaust pipe 1h. The high-pressure compressor 1b and the high-pressure turbine 1d are connected by a high-pressure shaft 2 and form a high-pressure (HP) body with the latter. The low-pressure compressor 1a and the low-pressure turbine 1e are connected by a low-pressure shaft 3 and form a low-pressure (LP) body with the latter.

The fan S is driven by a fan shaft 4, which is driven with the LP shaft 3 by means of a reduction gear 6. The reduction gear 6 is generally of the planetary or the epicyclic type.

Although the following description relates a planetary reduction gear or an epicyclic gear train, it also applies to a mechanical differential in which the three components, i.e. the planet-carrier, the ring gear and the sun gear are rotationally mobile, the rotation speed of one of these components depending on the speed difference of the two other components, in particular.

The reduction gear 6 is positioned in the front part of the turbine engine. A fixed structure comprising schematically, in this case, an upstream part 5a and a downstream part 5b, constituting the engine crankcase or stator 5, is arranged to form an enclosure E around the reduction gear 6. This enclosure E is here closed in the upstream part by gaskets located at the level of a bearing and allowing the passage of the fan shaft 4, and in the downstream section by gaskets located at the level of the passage of the LP shaft 3.

FIG. 2 shows a reduction gear 6 that can have different architectures depending on whether some parts are fixed or rotating. At the inlet, the reduction gear 6 is connected to the LP shaft 3, for example by means of inner splines 7a. The LP shaft 3 drives a planet pinion termed sun gear 7. Conventionally, the sun gear 7, of which the axis of rotation is the same as that of the turbine engine X, drives a series of pinions termed planet gears 8, these planet gears being evenly distributed over a single diameter around the axis of rotation X. This diameter is equal to twice the operating centre distance between the sun gear 7 and the planet gears 8. The number of planet gears 8 generally ranges from three to seven for this type of application.

The planet gears 8 are maintained by a chassis termed planet-carrier 10. Each planet gear 8 rotates about its own axis Y, and engages with the ring gear 9.

At the output, this provides:

In an epicyclic configuration, the planet gears 8 rotationally drive the planet-carrier 10 about the axis X of the turbine engine. The ring gear is secured to the engine crankcase or the stator 5 by means of a ring-carrier 12 and the planet-carrier 10 is secured to the fan shaft 4.

In a planetary configuration, the planet gears 8 are maintained by a planet-carrier 10 that is secured to the engine crankcase or the stator 5. Each planet gear drives the ring gear, which is supported on the fan shaft 4 by means of a ring-carrier 12.

Each planet gear 8 is mounted free to rotate by means of a bearing 11, for example a roller bearing or a hydrostatic bearing. Each bearing 11 is mounted on one of the axes 10b of the planet-carrier 10 and all the axes are positioned with respect to one another by means of one or several structural chassis 10a of the planet-carrier 10. The number of axes 10b and of bearings 11 is equal to the number of planet gears. For operating, assembly, manufacturing, control, repairs or replacement reasons, the axes 10b and the chassis 10a can be divided into several parts.

For the reasons mentioned above, the gearing of a reduction gear can be divided into several helixes, each with a median plane P. In this example, we will detail the operation of a reduction gear with several helixes and with a ring gear divided into two half-ring gears:

A front half-ring gear 9a consisting of a rim 9aa and an attachment half-flange 9ab. The rim 9aa has the front helix of the gearing of the reduction gear. This front helix engages with that of the planet gear 8, which in turn engages with that of the sun gear 7.

A rear half-ring gear 9b consisting of a rim 9ba and an attachment half-flange 9bb. The rim 9ba has the rear helix of the gearing of the reduction gear. This rear helix engages with that of the planet gear 8, which in turn engages with that of the sun gear 7.

Although the helix widths vary between the sun gear 7, the planet gears 8, and the ring gear 9 because of overlapping gearings, they are all centred on a median plane P for the front helixes, and on another median plane P for the rear helixes. In the other figures, in the case of a roller bearing with two rows of rollers, each row of rolling elements is also centred on two median planes.

The attachment half-flange 9ab of the front ring gear 9a and the attachment half-flange 9bb of the rear ring gear 9b form the attachment flange 9c of the ring gear. The ring gear 9 is secured to a ring-carrier by assembling the attachment flange 9c of the ring gear to the attachment flange 12a of the ring-carrier for example by means of a bolted assembly.

The arrows of the FIG. 2 show the path of the oil in the reduction gear 6. The oil arrives in the reduction gear 6 from the stator part 5 in the distributor 13 by different means that are not detailed in this view as they are specific to one or several types of architecture. The distributor is divided into 2 parts, and generally each part has the same number of planet gears. The purpose of the injectors 13a is to lubricate the gearings and the purpose of the arms 13b is to lubricate the bearings. The oil is brought to the injector 13a, exiting at its end 13c to lubricate the gearings. The oil is also brought to the arm 13b and circulates through the supply intake 13d of the bearing. The oil then circulates through the axis or in one or several buffer zones 10c to then exit through the orifices 10d in order to lubricate the bearings of the planet gears.

FIGS. 3 and 4 show an embodiment of a reduction gear 6 according to the invention.

The reduction gear 6 comprises a single-block planet-carrier 10.

The planet-carrier 10 comprises a cage comprising two radial annular walls 14a, 14b that extend around the axis X, these walls 14a, 14b being parallel and being respectively a front radial wall 14a and a rear radial wall 14b. The walls 14a, 14b are connected to one another at the outer peripheries thereof by fins 14c that are evenly distributed around the axis X. These fins 14c provide a structural connection between the walls 14a, 14b.

Each fin 14c comprises two arms or intersecting bars, and is therefore generally X-shaped. The walls 14a, 14b and the fins 14c are made of a single part. This enables the planet carrier 10 to form a structural unit, thereby eliminating problems relating to the assembly of several parts by means of additional connecting members. In particular, this avoids imbalance problems generated by assembly tolerances, assembly problems, and additional weight due to the multiplication of parts.

The fins 14c together define the first spaces 16 that extend circumferentially about the axis X and are axially delimited by the outer peripheral edges of the walls 14a, 14b. There are five fins 14c in the example shown here, and they together define five spaces 16 that are used for the purpose of mounting the planet gears 8 in the planet-carrier. The reduction gear also has five planet gears 8.

The reduction gear 10 further comprises a ring 15 for the attachment thereof to a stator element of the turbine engine (not shown). The ring 15 extends about the axis X, upstream or downstream from the rear wall 14b, and is connected to this wall by second fins 14d.

The fins 14d extend in the continuity of the bars of the fins 14c and are therefore at an angle with respect to straight lines parallel with the axis X. The ring 15, the walls 14a, 14b and the fins 14c, 14d are here made of a single part.

The ring 15 comprises a rear radial face 15a that extends in a plane P1 perpendicular to the axis X and on which opens a series of tapped orifices 15b receiving screws 15c for attaching the planet-carrier 10 to an elastically deformable member 40 (FIG. 3).

The ring 15 has an inner diameter D5 and an outer diameter D6. In the embodiment shown, the diameter D6 is similar to the outer diameters of the walls 14a, 14b and of the fins 14c, 14d.

As can be seen in the drawings, the ring 15 is axially distant from the rear wall 14b and the fins 14d together define second spaces 17a, 17b (FIG. 4).

The spaces 17a have a shape that is generally elongate in the circumferential direction around the axis X. They are substantially axially aligned with the spaces 16. Each space 17a is separated from a space 16 by an outer peripheral part of the wall 14b The spaces 17b are substantially axially aligned with the fins 14c. They have a generally triangular or trapezoidal shape that results from the fact that they communicate with the housings created between the intersecting bars of the fins 14c. Each space 17b is therefore not separated from these housings by an outer peripheral part of the wall 14b.

The cage of the planet-carrier 10 defines an inner housing for the reception of the sun gear 7 with an axis X, of the planet gears 8 arranged around the sun gear 7 and engaging therewith, as well as of the deflectors 18.

As described above for FIG. 2, the sun gear 7 comprises inner splines 7a for coupling with outer complementary splines of a LP shaft that is not shown (FIG. 3).

The reduction gear 6 comprises a lubricating oil distributor 13 that is better shown in FIG. 5.

The distributor 13 has a generally annular shape around the axis X and it is made of a single part. Here, it is provided and secured on the planet-carrier 10 and comprises, for this purpose, attachment lugs 19a on the planet-carrier and in particular on its rear wall 14b, as shown in FIG. 4. The lugs 19a are evenly distributed around the axis X and comprise portions pressed against the downstream radial face of the wall 14b and comprising orifices for the passage of screws 19, which are screwed in the tapped holes of the wall 14b.

The distributor 13 comprises first and second independent oil circuits 20, 21, the first oil circuit 20 comprising a first oil inlet 20a connected by a first annular chamber 20b to several oil outlets 20c distributed over a first circumference C1 about the axis X, and the second oil circuit 21 comprises a second oil inlet 21a connected by a second annular chamber 21b to several oil outlets 21c distributed over a second circumference C2 about the axis X (FIGS. 3 and 5).

The circumference C1 has a diameter D1 and the circumference C2 has a diameter D2, D2 being greater than D1.

The diameter of the distributor 13 is smaller than D5, which enables its assembly/disassembly inside the ring 15.

The outer diameter of the distributor 13 corresponds to the end of the inlets 20a, 21a (which generally end at the same circumference).

The chambers 20b, 21b are formed by two coaxial and inextricably connected tubular rings, i.e. their tubular walls are welded together. The chambers have, along an axial cross-section, a generally circular shape and the passage sections of the chambers are substantially constant on their entire circumferential length and are substantially identical to one another.

The first chamber 20b extends substantially over a circumference C4 with a diameter D4 between D1 and D2. The second chamber 21b extends substantially over another circumference C3 with a diameter D3 between D1 and D2. D3 is greater than D4. The circumferences C4 and C3 are centred on the axis X. D1 is smaller than D4 and D3, whereas D2 is greater than D4 and D3. It advantageous that C4 and C3 are located substantially at mid-(radial) distance between C1 and C2, as this stiffens the distributor 13.

The chamber 21b with the greater diameter is located in front of the chamber 20b with the smaller diameter. As seen in FIG. 3, the chambers extend in planes P2, P3 that are perpendicular to the axis X.

The inlets 20a, 21a are oriented in a radial direction with respect to the axis X. They are preferably located in a same plane P4 perpendicular to the axis X and are sloped with respect to one another in this plane P4 by a given angle α (FIG. 5). This angle α is for example between 30 and 60°. As seen in FIG. 4, the inlets 20a, 21a are oriented respectively along directions, each intersecting with one of the abovementioned spaces 17a, 17b.

The planes P2, P3 and P4 are located between the wall 14b and the ring 15 (FIGS. 6 and 7).

The distributor 13 is advantageously configured to be fluidly connected, at the level of its inlets and its outlets, by male-female fitting, i.e. by connections that only require fitting along an axial direction of motion of a male connector into a female connector. Even if a connector is presented in the following description as being male and intended to engage with a female connector, it can alternatively be replaced by a female connector intended, therefore, to engage with a male connector, and conversely.

With regard to the inlets 20a, 21a, each one comprises a female connector 20aa, 21aa in the example shown, intended to receive the male connector of a supply pipe 20f, 21f (FIGS. 4, 6 and 7). The pipes 20f, 21f are rectilinear and intersect with the abovementioned spaces 17a, 17b and are intended to also intersect with tubular arms of an intermediary crankcase of the turbine engine 1, for the purpose of connecting the distributor 13 to a source of lubricating oil. The sealing of the male-female connectors can be provided by O-rings or similar gaskets.

In the example shown, the pipe 20f intersects with a space 17b and the pipe 21f intersects with a space 17a that is located next to the space 17b intersected by the pipe 20f (FIG. 4).

The female connectors 20aa, 21aa of the inlets 20a, 21a are connected to the respective chambers through conduits 20d, 21d. The connector 20aa of the inlet 20a is connected to the chamber 20b the farthest from the plane P4 by a conduit 20ab that is generally S-shaped (FIG. 6). The connector 21aa of the inlet 21a is connected to the chamber 21b the closest to the plane P4 by a conduit 21ab that is rectilinear or features a slight elbow (FIG. 7).

With regard to the outlets 20c, each one comprises a female connector 20ca in the example shown, intended to receive the male connector of one of the deflectors 18. These outlets 20c are oriented axially, all in the same direction, which here is forwards. The connectors 20ca of these outlets are connected to the chamber 20b by substantially L- or V-shaped ducts 20d (FIG. 5).

With regard to the outlets 21c, each one comprises a female connector 21ca in the example shown, intended to receive the male connector of a lubricating and cooling core 22 shown in FIG. 3. These outlets 21c are oriented axially, all in the same direction, which here is forwards. The connectors 21ca of these outlets are connected to the chamber 21b by substantially L- or V-shaped conduits 21d.

As can be seen in FIG. 3, the lengths or axial dimensions of the ducts 20d and of the conduits 21d are different, the outlets 21c being located in a plane P5 perpendicular to the axis X, which is further forwards than the plane P6, which passes along the outlets 20c. The planes P5 and P6 pass along the cage of the planet-carrier 10.

Finally, as can be seen in FIG. 5, the ducts 20d are connected to the ring forming the chamber 20b by stitches 20e located on the inner periphery of said ring, whereas the conduits 21d are connected to the ring forming the chamber 21b by stitches 21e located on the outer periphery of said ring (FIG. 5).

As mentioned above, the outlets 21c of the distributor 13 are connected to cores 22. The purpose of the cores 22 is to lubricate and cool the axes 10b of the planet gears 8, which are here centred and guided by bearings 11 with rollers 11a.

In the embodiments shown, each axis 10b is guided by a double roller bearing 11, i.e. with double rows of rollers 11a. The two rows extend about a single axis that corresponds to the axis, noted Y of the axis 10b of the planet gear 8.

Conventionally, the rollers are guided in tracks defined by inner and outer rings. In the examples shown, a particularity of the invention resides in that the inner rings for guiding the rollers 11a are integrated in the axis 10b. The outer periphery of the axis 10b therefore comprises cylindrical tracks 11b for the rolling of the rollers 11a, each track 11b being axially delimited by annular ribs 11c, the purpose of which is to guide the cages 11d maintaining the rollers 11a. Furthermore, FIG. 3 shows that the outer rings are integrated with the inner periphery of the planet gears 8. The inner periphery of the planet gears 8 therefore comprises cylindrical tracks 8a for rolling the rollers 11a, the tracks 8a being separated from one another by an annular groove 8b opening radially inwards and at the bottom of which two radial drill holes 8c have been provided for the flow of oil.

The outer periphery of each planet gear 8 comprises a double-helix gearing 8d, i.e. two adjacent and coaxial helixes that are separated from one another in this case by an annular groove 8e opening radially outwards and at the bottom of which the drill holes 8c open.

As mentioned above, the outlets 20c of the distributor 13 are connected to the deflectors 18. The deflectors 18 can in particular be seen in FIGS. 3, 4 and 13. The reduction gear 6 comprises several deflectors 18 that are housed in the planet-carrier 10 and each is arranged between two adjacent planet gears 8. The number of deflectors 18 of the reduction gear 6 is therefore equal to the number of planet gears 8 of said reduction gear.

The primary purpose of a deflector 18 is to guide the lubricating oil of the gearings of the planet gears 8 and to prevent oil recirculation between the planet gears, hence the notion of "inter-planet gear deflector". The deflectors 18 are therefore conformed to fit with the peripheral shape of the planet gears 8.

In addition to extending between two adjacent planet gears 8, each deflector 18 is located between the sun gear 7 on the one hand, located radially inwards, and a fin 14c on the other hand, located radially outwards.

Each deflector 18 comprises a block comprising a first side surface 18a that is cylindrical and concave, and a second side surface 18b, opposite the first surface 18a, that is cylindrical and concave. The radiuses of curvature of these surfaces 18a, 18b of a deflector 18 are similar and measured from axes that are parallel with and merge with the axes Y of the planet gears 8 between which said deflector is mounted.

Each of the first and second surfaces 18a, 18b comprises a protruding tab 34 that has a generally elongate shape about the axis of revolution of the considered surface, and of which the inner periphery is curved and concave. The tabs 34 of a deflector 18 extend substantially in a single plane that is perpendicular to the axis X and are preferably located at the centre of the respective surfaces 18a, 18b (in the axial direction).

In the examples shown, the longitudinal ends of the tabs 34 intersect with planes that pass respectively along the radially external 18e and radially internal 18f faces of the deflector 18 and therefore protrude for the purpose, in particular, of extending the lengths of the tabs, and thereby the circumferential dimension for guiding the oil around the planet gears 8.

Furthermore, in the example shown, beyond the face 18e, the tabs 34 are supported by blades 18g protruding in the extension of the surfaces 18a, 18b.

The block of each deflector 18 further comprises a flat front face 18c, that is substantially radial when the deflector is mounted in the planet-carrier 10 of the reduction gear, and a flat rear face 18d, that is also substantially radial. The upper flat or radially external face 18e of the block is intended to be oriented towards the couple of fins 14c, 14d, and its lower or radially internal face 18f is intended to be oriented towards the sun gear 7. This face 18f is cylindrical and concave and has a radius of curvature measured from an axis that merged with the axis X of the sun gear. The purpose of this face 18f is therefore to guide the lubricating oil of the gearing of the sun gear.

The deflectors 18 extend between the radial walls 14a, 14b and their faces 18a, 18b bear against the inner face at the level of these walls 14a, 14b. The deflectors 18 are secured to the planet-carrier 10 by means of screws 35 for example. Each block can comprise, for example on its front face 18a, tapped holes for the reception of screws 35 for attaching the deflector to the front face 14a (FIG. 3). An identical configuration on the wall 14b is also possible.

In a mounted position, the tabs 34 of each deflector 18 extend in the middle and interior of the inter-helical grooves 8e of the two planet gears 8 between which said deflector is mounted. A predetermined clearance is provided between the top of each tab 34 and the bottom under the groove 8e in which the tab is inserted. The purpose of the tabs 34 is to limit the flow of oil from one gearing to another gearing of a single planet gear 8.

Each deflector 18 comprises an integrated lubricating circuit, that comprises an oil inlet 36a connected by drill holes 36b to at least one oil outlet 36c (FIG. 3). In the example shown, the oil inlet 36a is located on the rear face 18d and comprises a tubing intended to form a male connector and to cooperate by male-female fitting with the outlet 20c of the distributor 13 described above. Even if a connector is presented in the following description as being male and intended to engage with a female connector, it can alternatively be replaced by a female connector intended, therefore, to engage with a male connector, and conversely (FIG. 3).

In another embodiment, the deflectors 18 can be formed from a single part with the cage of the planet-carrier 10.

As shown in FIGS. 11 and 12 in particular, the walls 14a, 14b of the planet-carrier 10 each comprises holes 37 that are intended for the mounting of an end of a planet gear 8. These holes 37 can receive bearing seats of the planet gears 8 in a rotating manner.

Each one of the walls 14a, 14b comprises, between two adjacent holes 37, a notch 38, 39. In the example shown, each of these notches 38, 39 is aligned with a fin 14c along a plane passing through the axis X. Each notch 38 is located at the outer periphery of the wall 14a, between the corresponding bars of each fin 14c, and is generally U- or V-shaped, with an opening that is radially oriented outwards with respect to the axis X and communicating with the housing formed between the bars of said fin 14c (FIGS. 8 and 11). Each notch 39 is located at the outer periphery of the wall 14b and is generally U- or V-shaped, with an opening oriented radially outwards with respect to the axis X and communicating with the housing formed between the bars of this fin 14c and with one of the abovementioned spaces 17b (FIGS. 8 and 12).

As can be seen in particular in FIG. 8, the fins 18f of these deflectors 18 generally follow the U- or V-shape of the notches 38, 39.

With regard to the elastic member 40, in the embodiment of FIG. 3, it has the general shape of bellows, which provides it with a capacity for elastic deformation in the axial, radial and torsional direction, for example.

The member 40 has a general annular shape about the axis X and comprises an axial end, here a front end, secured to the ring 15 and an opposite axial end, here a rear end, not shown and attached to a stator element of the turbine engine. The front end of the member 40 has a radial wall 40a pressed axially against the face 15a and comprising through-orifices for the passage of the screws 15c, and a cylindrical centring wall 40b cooperating with an inner cylindrical surface of the ring 15. This cylindrical surface defines the diameter D5.

What is claimed is:

1. A fixed planet-carrier for a reduction gear, in particular for a turbine engine of an aircraft, said planet-carrier comprising an annular cage extending about an axis (X) and comprising two radial annular walls extending about the axis (X) and connected at their outer periphery by means of first fins, said radial walls for being arranged opposite planet gears of the reduction gear, and said first fins defining between them the first assembly spaces for these planet gears, wherein the planet-carrier is made of a single block and further comprises an attachment ring that extends about the axis (X) and is connected to one of said walls by means of second fins, said second fins defining between them second spaces, separate from the first spaces, and of which at least some are for being intersected by lubrication pipes of the reduction gear, wherein some of said second spaces are axially aligned with said first fins and each has a generally triangular shape.

2. The planet-carrier according to claim 1, wherein the first fins are generally X-shaped and the second fins extend in continuity with the first fins.

3. The planet-carrier according to claim 1, wherein the attachment ring has an outer diameter that is identical or near-identical to that of the radial walls.

4. The planet-carrier according to claim 1, wherein the attachment ring comprises a radial face on which opens a series of attachment means, such as tapped orifices.

5. The planet-carrier according to claim 1, wherein some of said second spaces are axially aligned with said first spaces and each has a generally elongate shape in a circumferential direction about the axis (X).

6. An assembly comprising a planet-carrier according to claim 1, and at least one of the following members:
- a distributor of lubricating oil, the distributor having a generally annular shape about the axis (X) and being mounted on the planet-carrier inside said ring, the distributor comprising at least an oil circuit comprising an oil inlet connected to a supply pipe extending in a radial direction and intersecting with one of said second spaces, and
- an elastically deformable member, said member having a generally annular shape about the axis (X) and comprising an axial end secured to said ring.

7. The assembly according to claim 6, wherein the distributor comprises two independent oil circuits, a first oil circuit comprising a first oil inlet connected by a first supply pipe intersecting with one of said second spaces, and a second oil circuit comprising a second oil inlet connected by a second supply pipe intersecting with another of said second spaces.

8. The assembly according to claim 7, wherein some of said second spaces are axially aligned with said first spaces and each has a generally elongate shape in a circumferential direction about the axis (X), or wherein some of said second spaces are axially aligned with said first fins and each has a generally triangular shape, wherein the first pipe intersects with a second space with a generally triangular or trapezoidal shape and the second pipe intersects with a second space with an elongate shape in the circumferential direction.

9. A reduction gear for a turbine engine of an aircraft, comprising a planet-carrier according to claim 1.

10. A reduction gear for a turbine engine of an aircraft, comprising an assembly according to claim 6.

11. An assembly comprising
- a planet-carrier comprising an annular cage extending about an axis (X) and comprising two radial annular walls extending about the axis (X) and connected at their outer periphery by first fins, said radial walls for being arranged opposite planet gears of the reduction gear, and said first fins defining between them the first assembly spaces for these planet gears, wherein the planet-carrier is made of a single block and further comprises an attachment ring that extends about the axis (X) and is connected to one of said walls by second fins, said second fins defining between them second spaces, separate from the first spaces, and of which at least some are for being intersected by lubrication pipes of the reduction gear, and at least one of the following members:
- a distributor of lubricating oil, the distributor having a generally annular shape about the axis (X) and being mounted on the planet-carrier inside said ring, the distributor comprising at least an oil circuit comprising an oil inlet connected to a supply pipe extending in a radial direction and intersecting with one of said second spaces, and
- an elastically deformable member, said member having a generally annular shape about the axis (X) and comprising an axial end secured to said ring and wherein the distributor comprises two independent oil circuits, a first oil circuit comprising a first oil inlet connected by a first supply pipe intersecting with one of said second spaces, and a second oil circuit comprising a second oil inlet connected by a second supply pipe intersecting with another of said second spaces.

12. An assembly comprising
- a planet-carrier comprising an annular cage extending about an axis (X) and comprising two radial annular walls extending about the axis (X) and connected at their outer periphery by first fins, said radial walls for being arranged opposite planet gears of the reduction gear, and said first fins defining between them the first assembly spaces for said planet gears, wherein the planet-carrier is made of a single block and further comprises an attachment ring that extends about the axis (X) and is connected to one of said walls by second fins, said second fins defining between them second spaces, separate from the first spaces, and of which at least some are for being intersected by lubrication pipes of the reduction gear, and
- a distributor of lubricating oil, the distributor having a generally annular shape about the axis (X) and being mounted on the planet-carrier inside said ring, the distributor comprising at least an oil circuit comprising an oil inlet connected to a supply pipe extending in a radial direction and intersecting with one of said second spaces.

* * * * *